(12) United States Patent  
Samler

(10) Patent No.: US 6,995,331 B2  
(45) Date of Patent: *Feb. 7, 2006

(54) WELDING TORCH HAVING COLLET AND BACKCAP ADAPTED FOR SECURING ENGAGEMENT AND METHOD FOR OPERATING SAME

(75) Inventor: Gary R. Samler, Holmes Beach, FL (US)

(73) Assignee: Illinois Tool Works Inc., Glenview, IL (US)

(*) Notice: Subject to any disclaimer, the term of this patent is extended or adjusted under 35 U.S.C. 154(b) by 118 days.

This patent is subject to a terminal disclaimer.

(21) Appl. No.: 10/244,655

(22) Filed: Sep. 16, 2002

(65) Prior Publication Data

US 2004/0050824 A1 Mar. 18, 2004

(51) Int. Cl.  
*B23K 9/28* (2006.01)

(52) U.S. Cl. ........................ 219/75; 219/138

(58) Field of Classification Search .......... 219/137.31, 219/137.51, 137.52, 137.62, 137.63, 137.9, 219/75, 138

See application file for complete search history.

(56) References Cited

U.S. PATENT DOCUMENTS

| | | | | | |
|---|---|---|---|---|---|
| 2,468,807 | A | * | 5/1949 | Herbst | 219/75 |
| 2,784,294 | A | * | 3/1957 | Gravert | 219/75 |
| 3,309,492 | A | * | 3/1967 | Fields | 219/75 |
| 3,522,406 | A | * | 8/1970 | Sipos et al. | 219/74 |
| 3,794,806 | A | * | 2/1974 | Klasson | 219/121.45 |
| 4,145,595 | A | * | 3/1979 | Keller et al. | 219/75 |
| 4,508,951 | A | * | 4/1985 | Rehrig, Jr. | 219/74 |
| 4,543,461 | A | * | 9/1985 | Hill | 219/75 |
| 5,403,987 | A | * | 4/1995 | Rehrig | 219/75 |
| 5,571,427 | A | * | 11/1996 | Dimock et al. | 219/75 |
| 6,005,221 | A | * | 12/1999 | Cusick, III | 219/137.62 |
| 6,399,913 | B1 | * | 6/2002 | Sammons et al. | 219/75 |
| 6,534,747 | B1 | * | 3/2003 | Rehrig | 219/137.31 |
| 6,884,958 | B2 | * | 4/2005 | Samler | 219/75 |

* cited by examiner

*Primary Examiner*—Kevin P. Kerns  
(74) *Attorney, Agent, or Firm*—Fletcher Yoder

(57) ABSTRACT

A collet and a backcap are provided that are securable to each other. The collet and backcap may be adapted for threaded engagement. The collet and backcap may be utilized in a welding torch. A method of securing a collet to a backcap is provided. The method may include threading a threaded portion of the collet to a threaded portion of a backcap. A method of securing an electrode to a welding torch also is provided. The method may include securing a collet to a backcap. The method also may include threading the collet to the backcap.

21 Claims, 5 Drawing Sheets

WELDING TORCH HAVING COLLET AND BACKCAP ADAPTED FOR SECURING ENGAGEMENT AND METHOD FOR OPERATING SAME

BACKGROUND OF THE INVENTION

The present invention relates generally to the field of arc welding systems, and more particularly to an arc welding torch adapted to receive a cylindrical metal electrode.

TIG (Tungsten Inert Gas) welding (also known as gas tungsten arc welding, GTAW, or HELIARC) is a type of arc welding process in which an electric arc is maintained between a metal electrode and a metal object. The heat generated by the arc produces localized melting of the metal object. The electrode, typically tungsten, is secured to a torch to enable a user to direct the electrode and establish the point of contact between the electrode and the object. TIG welding may be performed with or without the addition of a filler metal. Typically, the weld puddle and the area surrounding the weld puddle are protected from the atmosphere by an inert gas. The inert gas prevents rapid oxidation of the weld and the surrounding metal.

The electricity for the welding process is provided by a power source through a welding cable coupled to the torch. Typically, the power source is a constant voltage AC, DC, or a combination AC/DC source. In addition, a TIG welding cable typically is adapted to transport the inert gas to the torch. Furthermore, the TIG welding process typically generates a substantial amount of heat in the electrode. Consequently, cooling fluid may be used to cool the torch. Thus, a welding cable for a TIG welding system may transport electricity, gas, and cooling fluid.

The metal electrodes used in TIG welding typically are shaped like long, cylindrical, metal rods. A TIG welding electrode typically is secured to a TIG welding torch by a collet, a backcap, and a collet body or gas lens. Gas lenses typically have screens disposed therein to provide better gas flow characteristics than collet bodies. To secure the electrode to the welding torch, the electrode is inserted through the collet and collet body or gas lens. The collet body or gas lens is threaded into a front portion of a threaded torch head disposed within the torch body. The backcap is threaded onto the rear portion of the torch head. As the backcap is threaded onto the torch body, the backcap drives the collet against the interior of the collet body or gas lens. The collet is adapted to pinch down on the electrode as the collet is driven against an interior surface of the collet body or gas lens, thereby securing the electrode to the torch. In addition, the collet body is adapted to enable gas to flow into the rear end of the collet body around the electrode and out through holes in the side of the collet body or gas lens. A nozzle is used to direct the gas towards the object to be welded.

There are a number of problems associated with the use of conventional collets, back caps, and collet bodies or gas lenses to secure an electrode to a welding torch. One problem is that the collet may be misaligned with the backcap and/or collet body during assembly. For example, the collet may not remain concentric with the backcap using existing techniques, thereby producing an uneven flow of gas around the collet. In addition, loose parts, such as a collet, may be easily lost or dropped during assembly, increasing the time to complete the welding task.

A need exists for a technique to enable an electrode to be installed in a welding torch more easily than with existing collets and backcaps. More specifically, a need exists for a system to enable a collet to be secured to a backcap. In addition, there is a need for a technique for securing an electrode to a welding torch without misalignment of the collet and backcap and to provide better shielding gas flow around the collet.

SUMMARY OF THE INVENTION

The present technique provides a collet and backcap that are adapted to be secured together. The collet and backcap may be adapted for threaded engagement. The collet and backcap may be utilized in a welding torch of a welding system.

In accordance with another aspect of the present technique, a method of securing a collet to a backcap is provided. The method may comprise threading a threaded portion of the collet to a threaded portion of a backcap.

In accordance with another aspect of the present technique, a method of securing an electrode to a welding torch is provided. The method may comprise securing a collet to a backcap. The method also may comprise threading the collet to the backcap.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
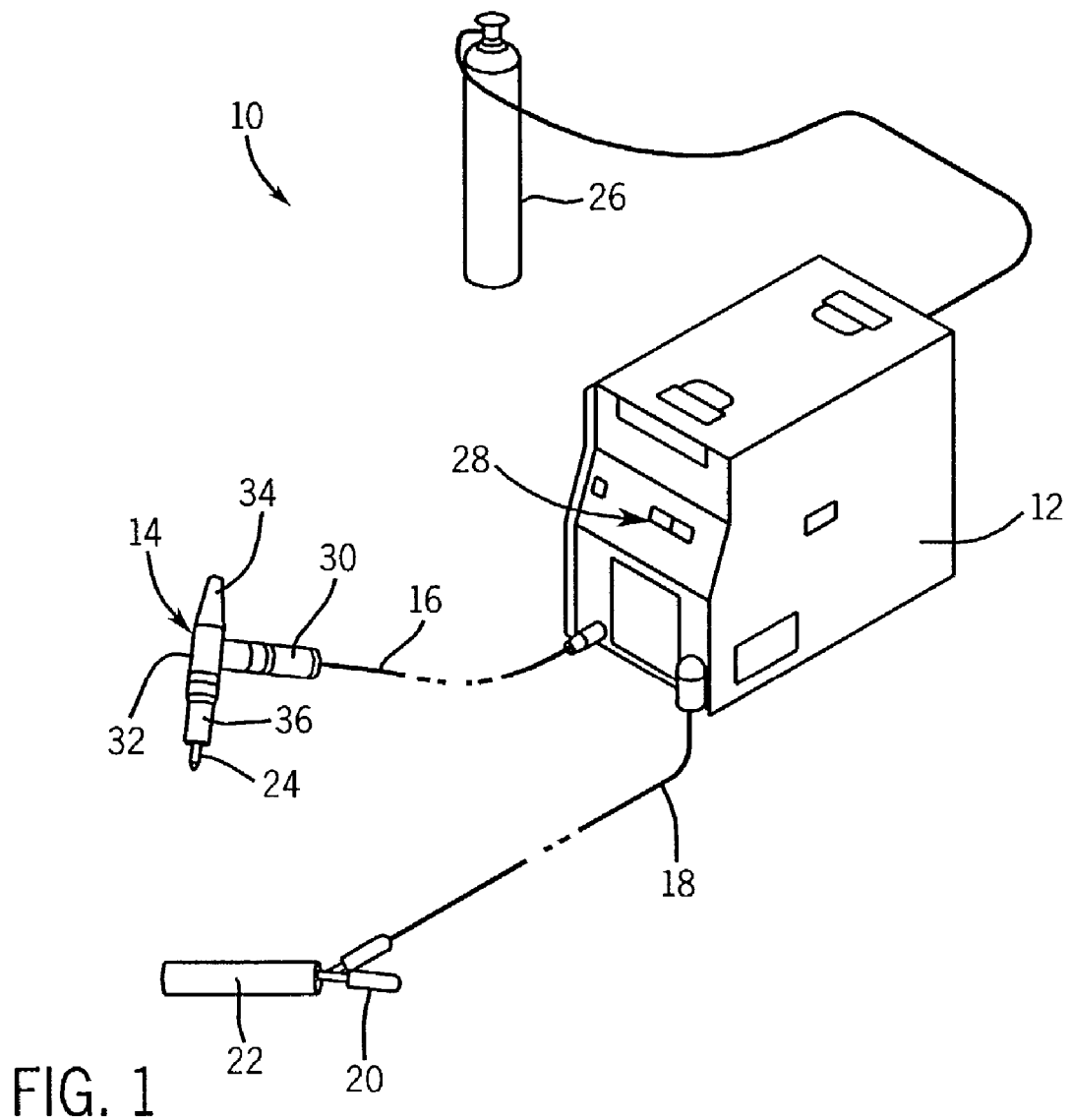
FIG. 1 is a perspective view of a welding system, according to an exemplary embodiment of the present technique.

Referring generally to FIG. 1, a TIG welding system is illustrated, as represented generally by reference numeral 10. However, the present technique may be utilized on other welding systems. The welding system 10 comprises a power supply 12, a welding torch 14, a welding cable 16, and a return cable 18. The power supply 12 may be a constant voltage AC, DC, a combination AC/DC source, or some other type of power supply. The welding cable 16 electrically couples the welding torch 14 to one terminal of the power supply 12. The return cable 18 is coupled to a second terminal of the power supply 12. In the illustrated embodiment, the return cable 18 has a clamp 20 that is adapted to secure and electrically couple the return cable 18 to a workpiece 22 to be welded. The welding torch 14 is adapted to receive an electrode 24. When the electrode 24 comes in close proximity to or touches the material 22 to be welded, an electric circuit is completed from one terminal of the power supply 12, through the welding cable 16, the electrode 24, the workpiece 22, the work clamp 20, and the return cable 18 to a second terminal of the power supply 12.

In the illustrated embodiment, in addition to electricity, gas from a gas source is coupled to the torch 14. In the illustrated embodiment, the gas source is a gas cylinder 26 coupled to the power supply 12. In the illustrated embodiment, the gas is coupled from the power supply 12 to the torch 14 through the welding cable 16. In this embodiment, the power supply 12 has numerous controls 28 to enable a user to control various operating parameters of the power supply 12, such as the output amperage.

In the illustrated embodiment, the welding torch 14 has a handle 30 that is adapted to receive the welding cable 16. The handle 30 also is adapted to be held by a user to direct the operation of the torch 14. The welding torch 14 also has a torch body 32 that is adapted to hold the electrode 24 and direct the inert gas towards the target material 22. In this embodiment, the torch 14 also has a back cap 34 to seal the end of the torch body 32 opposite the electrode so that the gas does not leak out of the torch body 32. Various lengths of back caps may be used to enable the torch body to receive electrodes of various lengths. In addition, a nozzle 36 is secured to the front end of the welding torch 14 to direct gas toward the workpiece 22.

Figure 2:
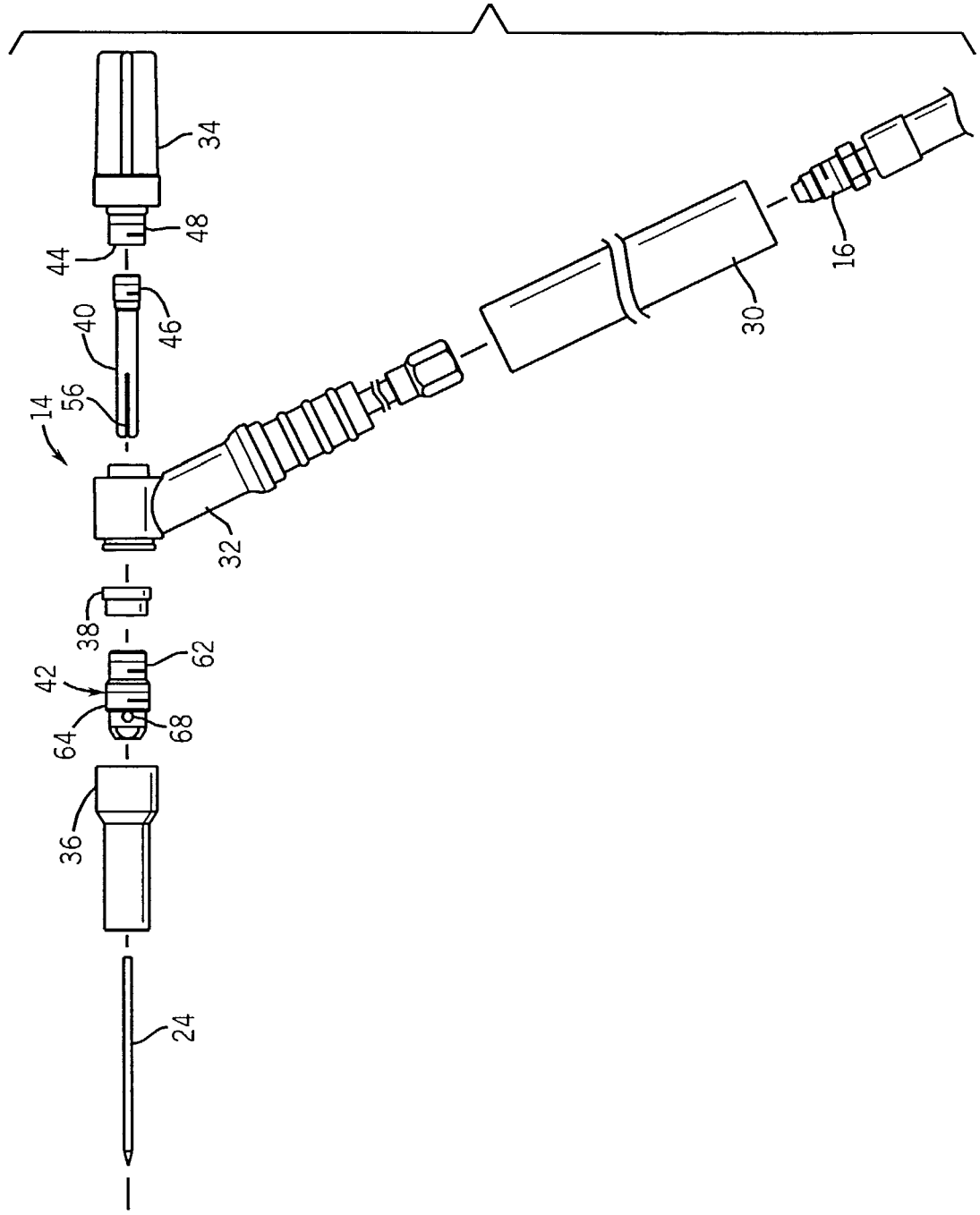
FIG. 2 is an exploded view of a welding torch, according to an exemplary embodiment of the present technique.

Referring generally to FIG. 2, an exploded view of welding torch 14 is illustrated. An insulator 38 is provided for electrical isolation. In the illustrated embodiment, a collet 40 and a collet body 42 are provided to secure the electrode 24 to the torch body 32. The collet 40 and collet body 42 cooperate with the backcap 34 to secure the electrode 24 to the torch body 32. In the illustrated embodiment, the collet 40 and backcap 34 are adapted for threaded engagement, rather than abutment. However, a device other than a collet body 42 may be used with the collet 40 to secure the electrode 24 to the torch body 32. For example, a gas lens may be used with the collet 40 to secure the electrode 24 to the torch body 32.

Figure 3:
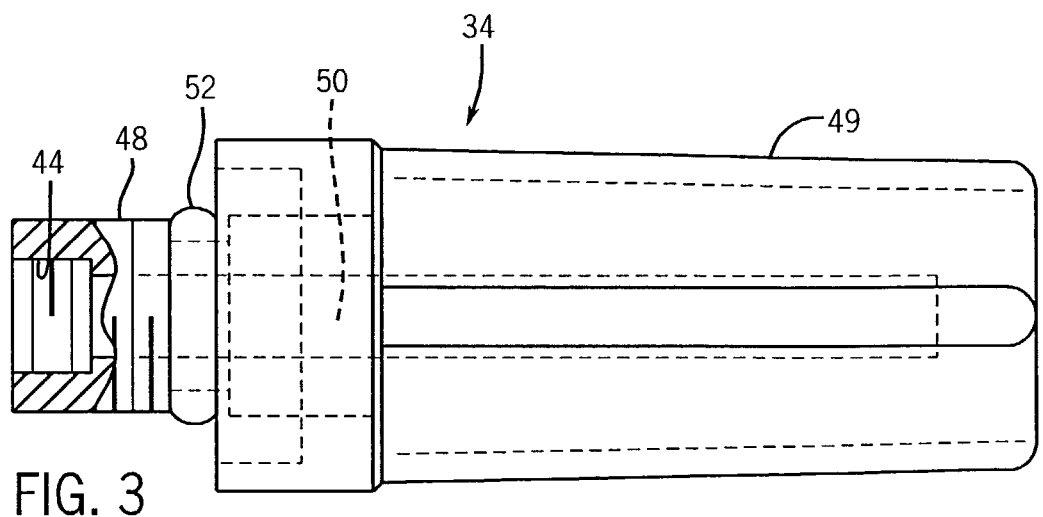
FIG. 3 is an elevational view of a backcap, according to an exemplary embodiment of the present technique.

Referring generally to FIGS. 2 and 3, the illustrated backcap 34 has a threaded inner portion 44 that is adapted to receive a corresponding threaded outer portion 46 of the collet 40. The backcap 34 also has a threaded outer portion 48 for securing the backcap 34 to the torch body 32. In the illustrated embodiment, the backcap 34 has a cap portion 49 that is adapted to receive the electrode 24 and to form a seal with the torch body 32. The backcap 34 has a chamber 50 that is adapted to enable a welding electrode 24 to extend into the cap portion 49. Preferably, the cap portion 49 has ergonomic features to facilitate manual rotation of the backcap 34. In the illustrated embodiment, the backcap 34 has a sealing member 52 to enable the backcap 34 to form a seal with the torch body 32 to prevent gas from escaping via the backcap 34.

Figure 4:
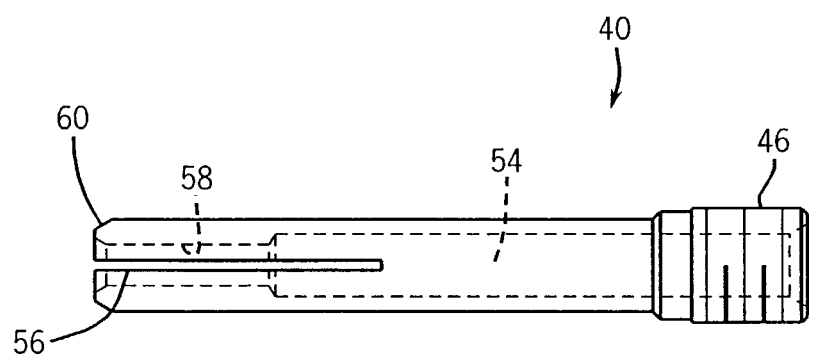
FIG. 4 is an elevational view of a collet, according to an exemplary embodiment of the present technique.

Referring generally to FIGS. 2 and 4, the collet 40 has a chamber 54 that extends through the collet 40 to enable an electrode 24 to extend through the collet 40. In addition, the collet 40 has a plurality of slits 56 that extend along a length of the collet 40 to enable the collet 40 to be compressed to narrow the chamber 54. A portion 58 of the chamber 54 is adapted to grip the electrode 24 as the collet 40 is compressed. The collet 40 is compressed when the collet 40 and collet body 42 are driven into abutment. In the illustrated embodiment, the collet 40 has a tapered end surface 60 to facilitate compression of the collet 40 during abutment with the collet body 42.

Figure 5:
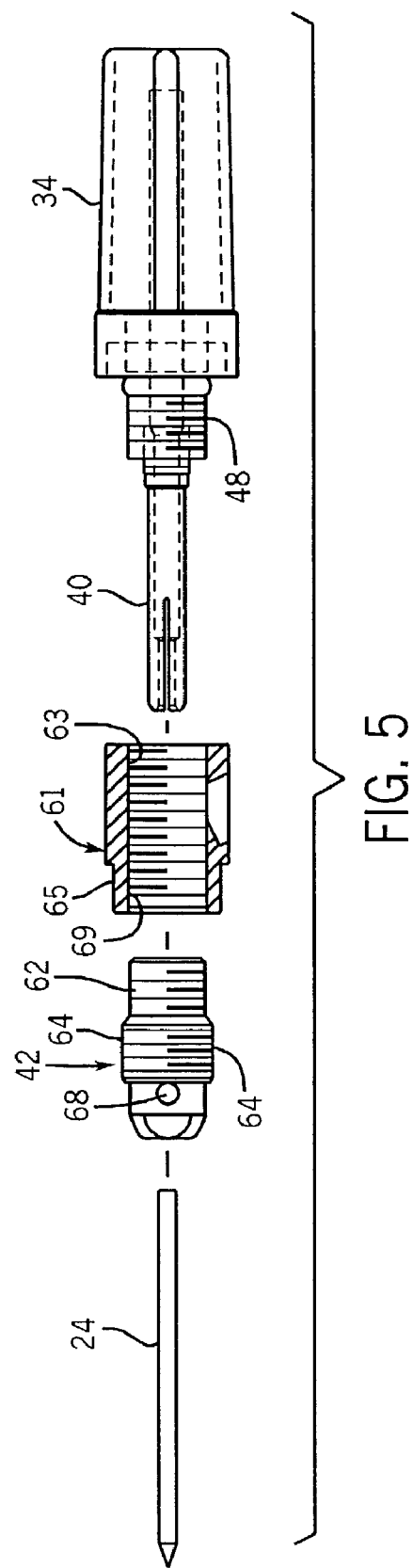
FIG. 5 is a detailed exploded view, illustrating the assembly of a portion of the welding torch, according to an exemplary embodiment of the present technique.

Referring generally to FIG. 5, an electrode 24 is secured to the torch body 32 by the cooperation of the backcap 34, the collet 40, and the collet body 42. However, as discussed above, a gas lens or a device other than the collet body 42 may be utilized in accordance with the present technique. A torch body 32 typically has a torch head 61 with a fully threaded inside diameter. The torch head 61 has a front threaded portion 69 to secure the collet body 42 or gas lens to the torch head 61 and a rear threaded portion 63 for securing the collet 40 and backcap 34 assembly to the torch head 61. The collet body 42 has a first threaded outer portion 62 that is adapted for securing the collet body 42 to the torch head 61 of the torch body 32. In addition, the torch head 61 also is adapted to receive the threaded outer portion 48 of the backcap 34. In addition, the collet body 42 has a second threaded portion 64 to enable the nozzle 36 to be secured to the collet body 42. In addition, an electrically insulating polymeric material 65 is disposed over most of the torch body 32.

Figure 6:
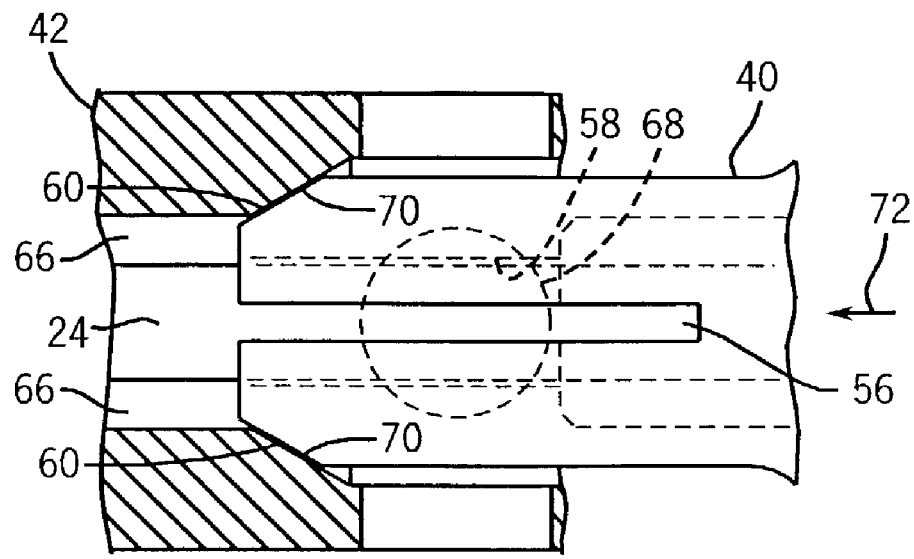
FIGS. 6 and 7 are cross-sectional views illustrating the operation of the collet in securing an electrode to the welding torch, according to an exemplary embodiment of the present technique.
Figure 7:
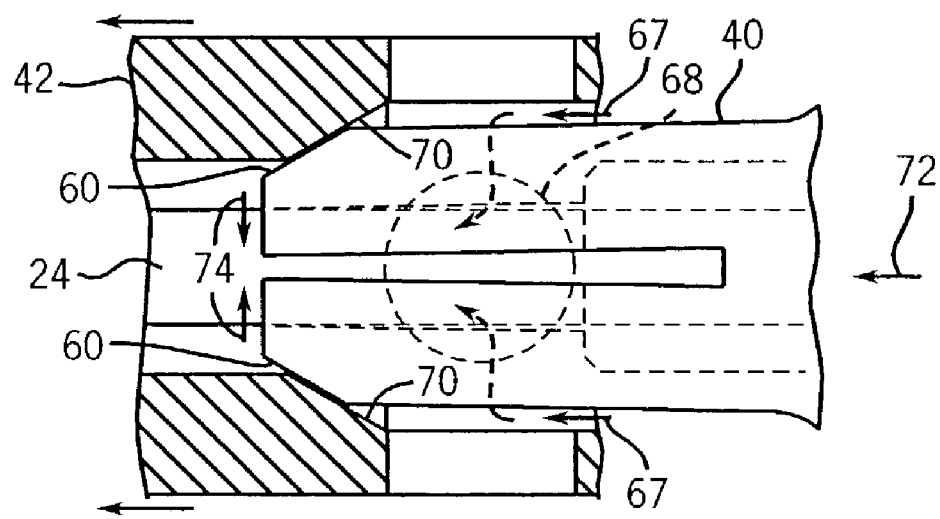

Referring generally to FIGS. 6 and 7, the collet body 42 has a chamber 66 that extends through the collet body 42. The chamber 66 is adapted to receive the collet 40 and to enable gas to flow through the collet body 42 in the region of the chamber 66 around the collet 40. The illustrated collet body 42 also has a plurality of exit holes 68 to enable gas to exit from the chamber 66 and to flow through the nozzle 36. The chamber 66 of the collet body also has a surface 70. The tapered surface 70 of the collet body 42 is adapted to abut the tapered end surface 60 of the collet 40 as the collet 40 and collet body 42 are driven into engagement and thereby apply a compressive force to the collet 40. The threaded portion 63 of the torch body 32 enables relative movement between the collet body 42 and the backcap 34 to enable the collet 40 and collet body 42 to be driven into abutment.

To secure an electrode 24 to the torch body, the electrode 24 is disposed through the collet body 42 and collet 40 and the collet 40 is threaded to the backcap 34. As discussed above, the backcap 34 has a threaded inner portion 44 that is adapted to receive a threaded outer portion 46 of the collet 40. By threading the collet 40 to the backcap 34, a consistent concentric arrangement of the collet 40 and backcap 34 is obtained. The consistent arrangement of the collet 40 and backcap 34 produces a uniform region for gas to flow through the torch body 32, thereby providing uniform characteristics in the flow of gas 67 through the torch body 32. The backcap 34 also has a threaded outer portion 48 that enables the backcap 34 to be secured to the torch body 32.

The electrode 24 may be disposed through the collet 40 before or after the collet 40 is secured to the backcap 34. In addition, the electrode 24 may be disposed through the collet body 42 before or after the collet body 42 is secured to the torch body 32. As the backcap 34 is threaded to the torch body 32, the backcap 34 urges the collet 40 towards the collet body 42, as represented by arrow 72. When the collet 40 engages the collet body 42, the collet 40 is compressed by the collet body 42, as represented by the arrows 74, causing the collet 40 to grip the electrode 24.

Preferably, the backcap 34 is threaded onto the torch body 32 to urge the collet 40 against the collet body 42. However, the collet body 42 may be threaded onto the torch body 32 to urge the collet body 42 against the collet 40. In addition, the collet 40 may be adapted with a threaded inner portion that is adapted to receive a corresponding threaded outer portion of the backcap 34. Thus, the collet 40 also may be adapted with a threaded outer portion 48 for securing the collet 40 to the torch body 32.

The techniques provided above enable a collet to be secured to a backcap, rather than simply being held by a loose abutment between a backcap and a collet body. Because the collet is secured to the backcap, the alignment of the collet within the torch body is more consistent and, thus, there is a more consistent flow of gas through the torch body around the collet. In addition, the assembly of the torch is simplified because the collet may be secured to the backcap. Therefore, the possibility of dropping a loose collet is greatly reduced. Furthermore, the process of changing from one electrode to another is facilitated because the process of changing the collets is facilitated by having the ability to secure the collet to the backcap.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of securing an electrode to a welding torch, comprising:
    securing a threaded collet adapted to capture the electrode to a back cap adapted to secure the collet to the welding torch;
    disposing the electrode through a first member securable to the welding torch;
    disposing the electrode through the threaded collet;
    securing the first member to the welding torch, such that the threaded collet captures the electrode in cooperation with the first member; and
    securing the backcap to the welding torch.

2. The method as recited in claim 1, wherein securing the backcap to the welding torch comprises threading the backcap to the welding torch.

3. The method as recited in claim 2, wherein threading the backcap to the welding torch wedges the threaded collet between the first member and the electrode.

4. The method as recited in claim 3, wherein securing the backcap to the welding torch comprises compressing the collet against the welding electrode.

5. A welding system, comprising:
    a power source; and
    a welding torch electrically coupleable to the power source, the welding torch comprising:
    a torch head;
    a first member securable to the torch head;
    a collet adapted to cooperate with the first member to secure an electrode to the torch head, the collet having a threaded portion; and
    a backcap having a first threaded portion adapted for threaded engagement with the torch head and a second threaded portion adapted for threaded engagement with the threaded portion of the collet.

6. The system as recited in claim 5, wherein the electrode is a cylindrical metal electrode.

7. The system as recited in claim 6, wherein the backcap is adapted to drive the collet into abutment with the first member to compress the collet against the electrode.

8. The system as recited in claim 7, wherein the torch head is adapted to direct gas through the torch head around the collet.

9. The system as recited in claim 5, wherein the welding system is a TIG welding system.

10. A welding torch, comprising:
    a torch body;
    a collet having a first threaded portion, the collet being adapted to receive a welding electrode and to cooperate with a second member to secure the welding electrode to the torch body; and
    a backcap comprising a first threaded portion adapted for threaded engagement with the torch body and a second threaded portion adapted for threaded engagement with the collet.

11. The welding torch as recited in claim 10, wherein the first threaded portion is disposed on an outer portion of the collet and the second threaded portion is disposed on an inner portion of the backcap.

12. The welding torch as recited in claim 10, wherein the collet is adapted with a chamber therethrough to enable the electrode to extend through the collet.

13. The welding torch as recited in claim 10, wherein the welding electrode is a cylindrical metal electrode.

14. The welding torch as recited in claim 10, wherein the torch body comprises a threaded portion adapted for threaded engagement with the backcap.

15. The welding torch as recited in claim 10, wherein the welding torch is adapted for use with a TIG welding system.

16. A welding torch, comprising:
    a torch body;
    a backcap having a first threaded portion configured to engage with corresponding threads located on the torch body, and a second threaded portion;
    a collet having a third threaded portion configured to engage with the second threaded portion and having compressible fingers configured to capture an electrode, wherein the third threaded portion is located on a first end of the collet and the compressible fingers are located on an opposite end of the collet; and
    a collet body configured to threadably engage with the torch body, wherein the collet body compresses the compressible fingers.

17. The welding torch as recited in claim 16, wherein the welding torch is adapted for use with a TIG welding system.

18. The welding torch as recited in claim 16, wherein the backcap is adapted to drive the collet into abutment with the first member to compress the collet against the electrode.

19. A welding torch, comprising:
    a backcap including first and second threaded portions, wherein the first threaded portion is radially outboard of the second threaded portion; and
    a collet having a third threaded portion configured to engage with the second threaded portion and having a capturing portion configured to compressibly capture an electrode, wherein the capturing portion and the third threaded portion are located at opposite ends of the collet.

20. The welding torch as recited in claim 19, wherein the collet is configured to compressibly capture a cylindrical metal electrode.

21. The welding torch as recited in claim 19, wherein the first threaded portion is configured to engage with the welding torch.

* * * * *